No. 805,093. PATENTED NOV. 21, 1905.
A. C. PROUDFIT.
COUPLING FOR ELECTRICAL CONDUITS.
APPLICATION FILED OCT. 14, 1903.
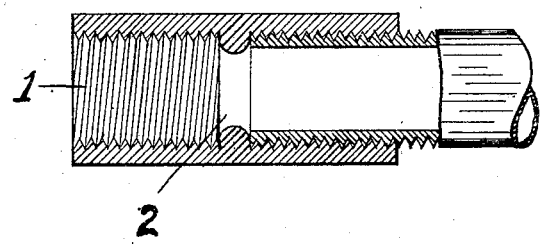
WITNESSES:
Harry H. Walton.
James H. Munro.
INVENTOR
Alexander C. Proudfit

UNITED STATES PATENT OFFICE.

ALEXANDER C. PROUDFIT, OF NEW YORK, N. Y.

COUPLING FOR ELECTRICAL CONDUITS.

No. 805,093.  Specification of Letters Patent.  Patented Nov. 21, 1905.

Application filed October 14, 1903. Serial No. 176,958.

*To all whom it may concern:*

Be it known that I, ALEXANDER C. PROUDFIT, of New York, State of New York, have invented certain Improvements in Couplings for Electrical Conduits, of which the following description, in connection with the accompanying drawing, is a specification, like numerals on the drawing designating like parts.

This invention relates to electrical conduits, and has for its object the provision of a coupling having means to prevent abrasion by the sharp "bur" often left on the end of a pipe after the same has been cut, an evil which is particularly apt to occur where the joint cannot be easily inspected and will therefore escape notice, as in the ordinary joint where adjacent ends of pipes are coupled in abutting relation. This evil is aggravated in the case of an untrimmed pipe when the pipes are not screwed home into the coupling until their ends are in contact, and often it is difficult to ascertain whether the coupling has been run upon the pipe ends so that the joint comes in the middle of the coupling, the failure to do this permitting a sag in the pipe and sometimes a break in the continuity of the conduit, as only a few threads are caught.

In accordance with my invention I provide a coupling for electrical conduits and the like having a plurality of mouths to receive, respectively, pipe ends, with an inner medial rounded flange or device, preferably of a diameter less than the pipe-bore, so that the wire passing through the joint will be kept out of contact with the pipe ends even though they are not driven home against each other, and when this flange or constriction is central within the coupling it furnishes an automatic stop, so that the workman can screw home the coupling until the end of the pipe strikes the flange and can then screw home the pipe into the opposite mouth until it in turn strikes the flange, and it will be impossible in so screwing home the second pipe to turn the coupling any further upon the first pipe, which would bring the joint of the pipes to one side of the coupling center and permit the sagging evil to which reference has been made above.

The various features of my invention will be illustrated and described fully in the accompanying drawing and specification and pointed out in the claims.

In the drawing the figure illustrates in vertical longitudinal section a coupling member in which my invention is embodied.

In the embodiment of my invention selected for illustration and description as a convenient form to enable a ready and complete understanding of my improvements the reference-numerals 1 and 2 designate, respectively, a pipe-coupling of well-known form and a medial inner device, shown as indicated in the middle of the coupling, taking the form of a flange or constriction less in diameter than the pipe-bore and presenting rounded surfaces toward each mouth of the coupling, acting in accordance with my invention to hold insulated wires out of contact with the end of the conduit-pipe which are connected by the coupling. The manner in which the coupling acts to accomplish this end and its function as a stop for the end of the pipe will be understood readily upon inspection of the drawing without further description, and it will be understood that I do not limit myself to the embodiment of this invention in a pipe having threaded mouths, nor in general do I limit myself to the specific construction illustrated other than as set forth in the claims read in connection with this specification.

What I claim, and desire to secure by Letters Patent, is—

1. A coupling member for electrical conduits and the like comprising a metal body having a plurality of mouths to receive pipe, and an inner integral, medial flange presenting convex rounded surfaces toward each mouth of said coupling, substantially as described.

2. A coupling member of the class described comprising a metal body having a plurality of mouths to receive pipe ends and an integral inner flange or constriction less in diameter than the pipe-bore and presenting convex surfaces toward each mouth of said coupling, substantially as described.

Signed at New York, in the county of New York and State of New York, this 12th day of October, A. D. 1903.

ALEXANDER C. PROUDFIT.

Witnesses:
CHARLES F. GEHRMANN,
HARRY H. WALTON.